US012502366B2

(12) United States Patent
Lin et al.

(10) Patent No.: US 12,502,366 B2
(45) Date of Patent: Dec. 23, 2025

(54) PHARMACEUTICAL COMPOSITION WITH LOW-CONTENT FLURBIPROFEN AXETIL (FPA), AND USE THEREOF

(71) Applicant: WISDOM PHARMACEUTICAL CO., LTD, Nantong (CN)

(72) Inventors: Jinping Lin, Beijing (CN); Huaxian Song, Beijing (CN); Zhongli Li, Beijing (CN); Jingwen Lin, Beijing (CN); Zhengwei Hu, Beijing (CN)

(73) Assignee: WISDOM PHARMACEUTICAL CO., LTD, Nantong (CN)

( * ) Notice: Subject to any disclaimer, the term of this patent is extended or adjusted under 35 U.S.C. 154(b) by 944 days.

(21) Appl. No.: 17/763,655

(22) PCT Filed: Sep. 22, 2020

(86) PCT No.: PCT/CN2020/116690
§ 371 (c)(1),
(2) Date: Mar. 25, 2022

(87) PCT Pub. No.: WO2021/057694
PCT Pub. Date: Apr. 1, 2021

(65) Prior Publication Data
US 2022/0331272 A1    Oct. 20, 2022

(30) Foreign Application Priority Data

Sep. 25, 2019 (CN) .......................... 201910913849.0

(51) Int. Cl.
*A61K 31/192* (2006.01)
*A61K 9/00* (2006.01)
*A61P 29/00* (2006.01)

(52) U.S. Cl.
CPC .......... *A61K 31/192* (2013.01); *A61K 9/0019* (2013.01); *A61P 29/00* (2018.01)

(58) Field of Classification Search
CPC .. A61K 31/192; A61K 31/222; A61K 9/0019; A61P 29/00
See application file for complete search history.

(56) References Cited

U.S. PATENT DOCUMENTS 4,613,505 A * 9/1986 Mizushima .......... A61K 31/365
514/786

FOREIGN PATENT DOCUMENTS

| CN | 1621035 A | 6/2005 |
| CN | 103301063 A | 9/2013 |
| CN | 103393631 A | 11/2013 |
| CN | 104434798 A | 3/2015 |
| CN | 103393631 B * | 4/2015 |
| CN | 108143715 A * | 6/2018 ........... A61K 9/0019 |
| CN | 109985004 A | 7/2019 |
| JP | 2018150387 A | 9/2018 |

OTHER PUBLICATIONS

Lin, CN 108143715 A, publ. Jun. 12, 2018, English translation (Year: 2018).*
Lin, CN 103393631 B, publ. Apr. 8, 2015, English translation (Year: 2015).*
Mayo Clinic, "Fever: First aid", downloaded from internet https://www.mayoclinic.org/first-aid/first-aid-fever/basics/art-20056685 on Jan. 8, 2025 (Year: 2025).*

* cited by examiner

*Primary Examiner* — Sarah Pihonak
(74) *Attorney, Agent, or Firm* — Bayramoglu Law Offices

(57) ABSTRACT

Use of a flurbiprofen axetil (FPA) in preparing a pharmaceutical composition for fever relief in a patient through an intravenous administration route is provided, where the pharmaceutical composition includes FPA at a content of 10 mg to 40 mg, preferably 10 mg to 35 mg, 15 mg to 35 mg, and 15 mg to 30 mg, 15 mg, and 30 mg. The pharmaceutical composition can be safely and effectively used for fever relief in an adult patient. Surprisingly, the pharmaceutical composition has a comparable antipyretic effect and duration to a pharmaceutical composition with high-content FPA, but the pharmaceutical composition with low-content FPA has less adverse reactions. Compared with ibuprofen injections, a single administration of the low-dosage FPA provided by the present disclosure can maintain an antipyretic effect for 6 hours to 10 hours or more, which significantly reduces the administration frequency and improves the compliance of a patient.

5 Claims, 1 Drawing Sheet

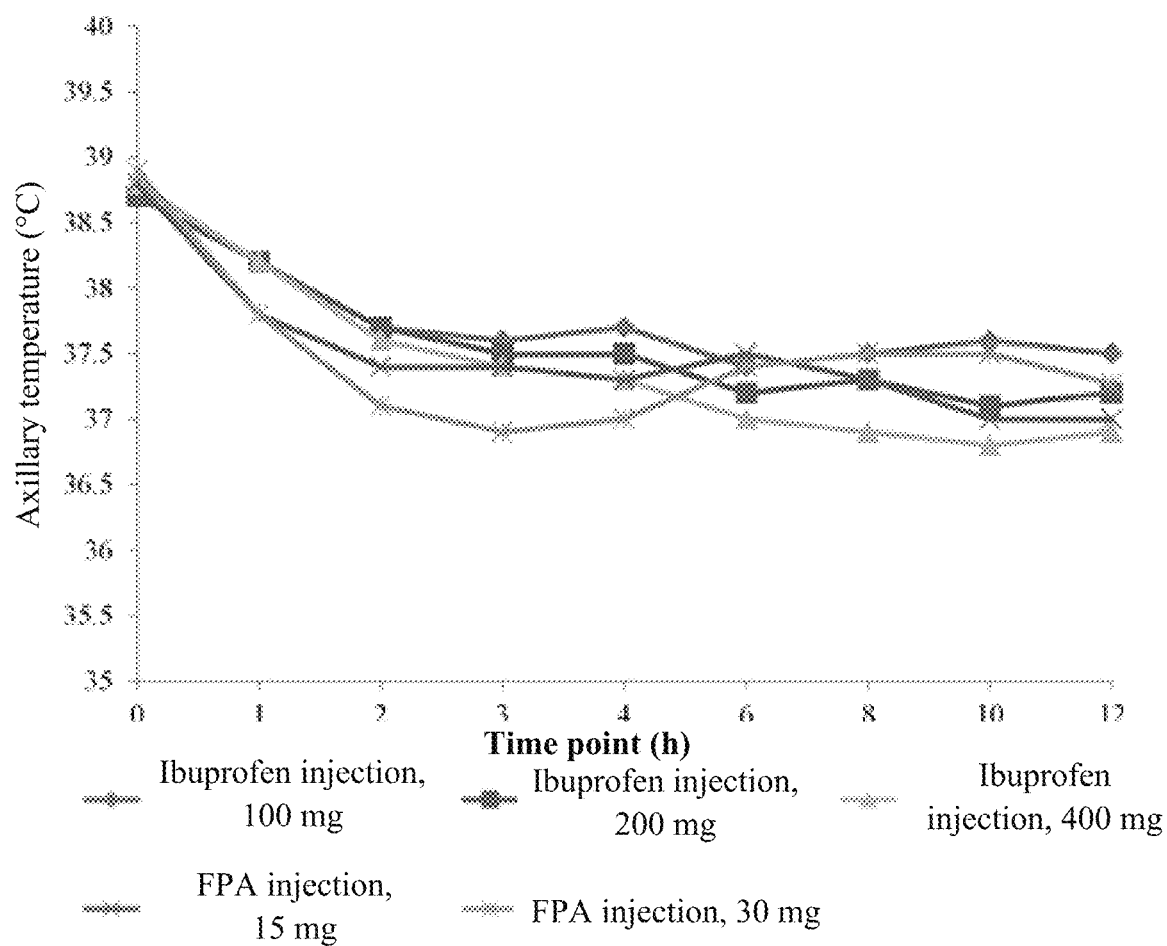

PHARMACEUTICAL COMPOSITION WITH LOW-CONTENT FLURBIPROFEN AXETIL (FPA), AND USE THEREOF

CROSS REFERENCE TO THE RELATED APPLICATIONS

This application is the national phase entry of International Application No. PCT/CN2020/116690, filed on Sep. 22, 2020, which is based upon and claims priority to Chinese Patent Application No. 201910913849.0, filed on Sep. 25, 2019, the entire contents of which are incorporated herein by reference.

TECHNICAL FIELD

The present disclosure relates to the technical field of drugs, and in particular to a preparation with low-content flurbiprofen axetil (FPA), and use thereof.

BACKGROUND

Fever is a common symptom in clinical practice, and excessive heat can cause headache, insomnia, and even convulsion, in which case it is necessary to appropriately select an antipyretic drug to lower the body temperature. Antipyretic drugs most commonly used in clinical practice are ordinary oral preparations, but the oral preparations have disadvantages such as slow absorption and efficacy, low bioavailability, gastrointestinal adverse reactions, and unsuitability for patients with dysphagia. In particular, in clinical practice, there are often patients who are unsuitable for or unable to take oral preparations for some reasons, and fever in these patients can only be relieved through an intravenous administration route.

Intravenous injection preparations most commonly used in clinical practice are ibuprofen injections. The ibuprofen injection needs to be administered every 4 hours, and a too-high administration frequency will affect the normal sleep and recovery of a patient. Therefore, there is an urgent need for an intravenously-administered drug that can be maintained for a long time after a single administration.

The FPA injection first went on the market in Japan in July 1992, and went on the market in China in 2004 under the trade name "Kaifen". Clinically, a single administration of 50 mg of FPA can be used for postoperative analgesia and analgesia for various cancers.

At present, there is no research on the treatment of fever in patients with an FPA injection, and in the instructions of currently marketed FPA injections, it is stated that the FPA injections cannot be used to relieve fever in fever patients.

FPA is a non-steroidal anti-inflammatory drug (NSAID). Adverse reactions of an NSAID are closely related to its content, and the increase of the content can significantly increase an incidence of adverse reactions.

In view of the above situation, the present disclosure provides use of a pharmaceutical composition with low-content FPA in fever relief.

SUMMARY

The present disclosure relates to a pharmaceutical composition with low-content FPA, and use of the pharmaceutical composition in fever relief.

According to a first aspect of the present disclosure, the present disclosure provides use of the FPA in preparing a pharmaceutical composition for fever relief in a patient through an intravenous administration route, where the pharmaceutical composition includes 10 mg to 40 mg of FPA.

In the above pharmaceutical composition, a content of FPA may be 10 mg to 35 mg, 15 mg to 35 mg, and 15 mg to 30 mg.

In the above pharmaceutical composition, the content of FPA can be any value in the above range, for example, the content of FPA can be 10 mg, 15 mg, 20 mg, 25 mg, 30 mg, 35 mg, 40 mg, and the like. The content of FPA may preferably be 15 mg or 30 mg.

The antipyretic effect of the pharmaceutical composition for a patient can be maintained for 6 hours to 10 hours or more, and usually, the antipyretic effect can be maintained for 8 hours or more, which can significantly reduce the administration frequency, enable adequate rest time for a patient, and improve the compliance of a patient.

The above-mentioned intravenous administration can be direct intravenous injection or intravenous infusion after dilution with other common compatible diluents used clinically (including but not limited to 0.9% sodium chloride injection and 5% glucose injection). Different intravenous administration routes do not affect the efficacy of this product.

In a second aspect of the present disclosure, the pharmaceutical composition of the present disclosure may include the FPA, oil-for-injection, an emulsifying agent, an isoosmotic adjusting agent, a pH adjusting agent, and water-for-injection (WFI).

The emulsifying agent is a phospholipid, including but not limited to a natural phospholipid, a synthetic phospholipid, and a combination thereof.

The oil-for-injection includes but is not limited to refined soybean oil, safflower oil, cottonseed oil, olive oil, coconut oil, castor oil, fish oil, medium-chain monoglyceride, medium-chain diglyceride, medium-chain triglyceride, ethyl oleate, acetylated monoglyceride, propylene glycol diester, glyceryl linoleate, Gelucire 44-14, or a combination thereof.

The pH adjusting agent includes, but is not limited to, sodium hydroxide, hydrochloric acid, phosphoric acid, phosphate, citric acid, citrate, acetic acid, acetate, or a combination thereof.

The pharmaceutical composition is prepared by a method including the following steps:
(1) taking a part of the WFI, heating, and dissolving the isoosmotic adjusting agent in the WFI to obtain a water phase;
(2) heating the oil-for-injection, adding the emulsifying agent and the FPA, and stirring for dissolution to obtain an oil phase;
(3) adding the oil phase in step (2) to the water phase in step (1), heating, and conducting high-speed shear dispersion to obtain an initial emulsion;
(4) adjusting a pH of the initial emulsion to 5.0 to 9.0, and adding the remaining WFI;
(5) conducting high-pressure homogenization; and
(6) filtering, bottling, sealing, and sterilizing.

The pharmaceutical composition with low-content FPA provided in the present disclosure can be safely and effectively used for fever relief in an adult patient. Surprisingly, the pharmaceutical composition with low-content FPA has a comparable antipyretic effect and duration to a pharmaceutical composition with high-content FPA, but the pharmaceutical composition with low-content FPA has less adverse reactions. Compared with ibuprofen injections, a single administration of the pharmaceutical composition with low-content FPA provided by the present disclosure can maintain an antipyretic effect for 6 hours to 10 hours or more, which significantly reduces the administration frequency and improves the compliance of a patient.

BRIEF DESCRIPTION OF THE DRAWINGS

FIG. 1 shows antipyretic temperature-time curves of FPA injections and ibuprofen injections.

DETAILED DESCRIPTION OF THE EMBODIMENTS

Example 1

Preparation of a 10 mg-FPA Injection

| Formula | Content | % (w/v) |
| --- | --- | --- |
| FPA | 10 g | 1 |
| Olive oil | 100 g | 10 |
| Glycerin | 22.1 g | 2.21 |
| Egg lecithin | 12 g | 1.2 |
| WFI | 1,000 ml | |

Preparation Method:
(1) WFI was taken and heated to 65° C., and glycerin was dissolved in the WFI to obtain a water phase.
(2) Olive oil was taken and heated to 65° C., then the egg lecithin and the FPA were added, and a resulting mixture was stirred for dissolution to obtain an oil phase.
(3) The oil phase in step (2) was added to the water phase in step (1), and a resulting mixture was heated to 65° C. and subjected to high-speed shear dispersion to obtain an initial emulsion.
(4) A pH of the initial emulsion in step (3) was adjusted to 7.0 to 8.0, and WFI was added at 1,000 ml.
(5) The high-pressure homogenization was conducted.
(6) A resulting homogenate was filtered, bottled at a specification of 1 ml, sealed, and sterilized.

Example 2

Preparation of a 15 mg-FPA Injection

| Formula | Content | % (w/v) |
| --- | --- | --- |
| FPA | 10 g | 1 |
| Soybean oil | 100 g | 10 |
| Glycerin | 22.1 g | 2.21 |
| Egg lecithin | 12 g | 1.2 |
| WFI | 1,000 ml | |

Preparation Method:
(1) WFI was taken and heated to 65° C., and glycerin was dissolved in the WFI to obtain a water phase.
(2) Soybean oil was taken and heated to 65° C., then the egg lecithin and the FPA were added, and a resulting mixture was stirred for dissolution to obtain an oil phase.
(3) The oil phase in step (2) was added to the water phase in step (1), and a resulting mixture was heated to 65° C. and subjected to high-speed shear dispersion to obtain an initial emulsion.
(4) A pH of the initial emulsion in step (3) was adjusted to 4.5 to 6.5, and WFI was added at 1,000 ml.
(5) The high-pressure homogenization was conducted.
(6) A resulting homogenate was filtered, bottled at a specification of 1.5 ml, sealed, and sterilized.

Example 3

Preparation of a 20 mg-FPA Injection

| Formula | Content | % (w/v) |
| --- | --- | --- |
| FPA | 10 g | 1 |
| Olive oil | 50 g | 5 |
| Medium-chain triglyceride | 50 g | 5 |
| Glycerin | 22.1 g | 2.21 |
| Egg lecithin | 12 g | 1.2 |
| WFI | 1,000 ml | |

Preparation Method:
(1) WFI was taken and heated to 65° C., and glycerin was dissolved in the WFI to obtain a water phase.
(2) Olive oil and medium-chain triglyceride were taken and heated to 65° C., then the egg lecithin and the FPA were added, and a resulting mixture was stirred for dissolution to obtain an oil phase.
(3) The oil phase in step (2) was added to the water phase in step (1), and a resulting mixture was heated to 65° C. and subjected to high-speed shear dispersion to obtain an initial emulsion.
(4) A pH of the initial emulsion in step (3) was adjusted to 4.5 to 7.5, and WFI was added at 1,000 ml.
(5) The high-pressure homogenization was conducted.
(6) A resulting homogenate was filtered, bottled at a specification of 2 ml, sealed, and sterilized.

Example 4

Preparation of a 30 mg-FPA Injection

| Formula | Content | % (w/v) |
| --- | --- | --- |
| FPA | 10 g | 1 |
| Soybean oil | 100 g | 10 |
| Glycerin | 22.1 g | 2.21 |
| Egg lecithin | 12 g | 1.2 |
| WFI | 1,000 ml | |

Preparation Method:
(1) WFI was taken and heated to 65° C., and glycerin was dissolved in the WFI to obtain a water phase.
(2) Soybean oil was taken and heated to 65° C., then the egg lecithin and the FPA were added, and a resulting mixture was stirred for dissolution to obtain an oil phase.
(3) The oil phase in step (2) was added to the water phase in step (1), and a resulting mixture was heated to 65° C. and subjected to high-speed shear dispersion to obtain an initial emulsion.
(4) A pH of the initial emulsion in step (3) was adjusted to 4.5 to 6.5, and WFI was added at 1,000 ml.
(5) The high-pressure homogenization was conducted.
(6) A resulting homogenate was filtered, bottled at a specification of 3 ml, sealed, and sterilized.

Example 5

Preparation of an FPA Injection with 40 mg FPA

| Formula | Content | % (w/v) |
| --- | --- | --- |
| FPA | 10 g | 1 |
| Olive oil | 50 g | 5 |
| Medium-chain triglyceride | 50 g | 5 |
| Glycerin | 22.1 g | 2.21 |
| Egg lecithin | 12 g | 1.2 |
| WFI | 1,000 ml | |

Preparation Method:
 (1) WFI was taken and heated to 65° C., and glycerin was dissolved in the WFI to obtain a water phase.
 (2) Olive oil and medium-chain triglyceride were taken and heated to 65° C., then the egg lecithin and the FPA were added, and a resulting mixture was stirred for dissolution to obtain an oil phase.
 (3) The oil phase in step (2) was added to the water phase in step (1), and a resulting mixture was heated to 65° C. and subjected to high-speed shear dispersion to obtain an initial emulsion.
 (4) A pH of the initial emulsion in step (3) was adjusted to 4.5 to 6.5, and WFI was added at 1,000 ml.
 (5) The high-pressure homogenization was conducted.
 (6) A resulting homogenate was filtered, bottled at a specification of 4 ml, sealed, and sterilized.

Comparative Example 1

Preparation of a 50 mg-FPA Injection

| Formula | Content | % (w/v) |
| --- | --- | --- |
| FPA | 10 g | 1 |
| Soybean oil | 100 g | 10 |
| Glycerin | 22.1 g | 2.21 |
| Egg lecithin | 12 g | 1.2 |
| WFI | 1,000 ml | |

Preparation Method:
 (1) WFI was taken and heated to 65° C., and glycerin was dissolved in the WFI to obtain a water phase.
 (2) Soybean oil was taken and heated to 65° C., then the egg lecithin and the FPA were added, and a resulting mixture was stirred for dissolution to obtain an oil phase.
 (3) The oil phase in step (2) was added to the water phase in step (1), and a resulting mixture was heated to 65° C. and subjected to high-speed shear dispersion to obtain an initial emulsion.
 (4) A pH of the initial emulsion in step (3) was adjusted to 4.5 to 6.5, and WFI was added at 1,000 ml.
 (5) The high-pressure homogenization was conducted.
 (6) A resulting homogenate was filtered, bottled at a specification of 5 ml, sealed, and sterilized.

Example 6

A Randomized, Double-Blind Phase II Clinical Trial to Evaluate the Efficacy and Safety of FPA Injections in the Treatment of Acute Fever in Contrast to a Placebo The main research unit of this clinical trial was the First Affiliated Hospital, Zhejiang University School of Medicine, with a total of 10 centers participating in the clinical trial.

Inclusion criteria: (1) 18 to 65 years old (including 18 and 65), male or female; (2) hospitalized fever patients or observed patients in hospital with a body temperature $\geq 38.5°$ C. (axillary temperature); (3) no intravenous infusion disorder; and (4) voluntary signature of informed consent.

Exclusion criteria: (1) those who have taken an antipyretic drug (such as acetaminophen, aspirin, and other NSAIDs, or chlorpromazine) within 4 hours before random enrollment; (2) those who have abnormal liver and kidney functions (an ALT or AST value is more than 3 times an upper limit of a normal range; and a creatinine content is more than 1.5 times an upper limit of a normal range); (3) patients who are allergic to NSAIDs such as FPA and ingredients such as COX-2 receptor inhibitors; (4) patients who have a history of gastrointestinal bleeding or perforation after previous NSAID use; (5) those who have active gastrointestinal bleeding within 6 weeks and require treatment; (6) patients who have been hospitalized due to severe head trauma or have experienced brain surgery or shock in the 30 days before random enrollment; (7) patients who have cerebral arteriovenous malformations, cerebral aneurysms, and central nervous system-tumors according to previous evidence; (8) those who have a history of congenital bleeding disorders (such as hemophilia), any active clinically-significant bleeding, abnormal platelet functions, a coagulation function test prothrombin time (PT) that is 3 s more than an upper limit of a normal range, or a platelet count $<50 \times 10^9$ L; (9) patients who have severe heart failure; (10) patients who are underweight ($<40$ kg); (11) patients who have refractory hypertension (it is defined as that after 3 different types of antihypertensive drugs (one of which is a diuretic) are administered simultaneously, a blood pressure remains above 180/110 mmHg); (12) patients who have blood disease fever, drug fever, and nervous fever; (13) women who are pregnant or breast-feeding; (14) patients who need to receive corticosteroid treatment during a test process; (15) patients who have participated in clinical studies of other drugs within 1 month; (16) patients who have poor compliance and are unable to complete a test according to a protocol; and (17) patients who are deemed by investigators to be unsuitable for participation in this clinical study.

Experimental Group Drug: FPA Injection
Control Group Drug: Blank Emulsion Injection (without FPA)

There were 148 cases for FAS: 36 in a 50 mg group, 36 in a 15 mg group, 36 in a 30 mg group, 36 in a 50 mg group, and 40 in a placebo group; and there were 143 cases for PPS: 33 in a 50 mg group, 35 in a 15 mg group, 36 in a 30 mg group, and 39 in a placebo group. There was no significant difference among the four groups in demographic indexes; and there was no significant difference among the groups in drug allergy history, other disease histories, drug treatment within the past 3 days, antipyretic drug treatment 4 hours before enrollment, and past-operation history. There was no significant difference among the four groups in baseline vital signs (systolic blood pressure (SBP), diastolic blood pressure (DBP), respiration, and heart rate), baseline body temperature, and physical examination. Therefore, the baseline indexes of the four groups of patients before enrollment were comparable.

Efficacy Analysis

A proportion of patients whose body temperature drops below 37.8° C. at this time point after administration and who do not receive emergency treatment before this time point is set as an effective rate. FAS analysis showed that at 6 hours, the 50 mg group had an effective rate of 61.11%, the 30 mg group had an effective rate of 63.89%, the 15 mg group had an effective rate of 50.00%, and the placebo group had an effective rate of 27.5%; at 7 hours, the 50 mg group had an effective rate of 55.56%, the 30 mg group had an effective rate of 55.56%, the 15 mg group had an effective rate of 47.22%, and the placebo group had an effective rate of 30.00%; at 8 hours, the 50 mg group had an effective rate of 50.00%, the 30 mg group had an effective rate of 50.00%, the 15 mg group had an effective rate of 47.22%, and the placebo group had an effective rate of 30.00%; and at 10 hours, the 30 mg group had an effective rate of 52.78%, the 15 mg group had an effective rate of 55.56%, and the placebo group had an effective rate of 27.50%. PPS analysis showed that at 6 hours, the 50 mg group had an effective rate of 63.64%, the 30 mg group had an effective rate of 63.89%, the 15 mg group had an effective rate of 48.57%, and the placebo group had an effective rate of 28.21%; at 7 hours, the 50 mg group had an effective rate of 60.61%, the 30 mg group had an effective rate of 55.56%, the 15 mg group had an effective rate of 48.57%, and the placebo group had an effective rate of 30.77%; at 8 hours, the 50 mg group had an effective rate of 51.52%, the 30 mg group had an effective rate of 50.00%, the 15 mg group had an effective rate of 48.57%, and the placebo group had an effective rate of 30.77%; and at 10 hours, the 30 mg group had an effective rate of 52.78%, the 15 mg group had an effective rate of 57.14%, and the placebo group had an effective rate of 28.21%. There was a significant difference between the treatment group and the placebo group.

Based on the above data, it can be found that the effects of 15 mg and 30 mg FPA injections in the treatment of fever are significantly better than that of placebo, and the antipyretic effect can be effectively maintained for 6 hours to 10 hours or more. Surprisingly, the low-content FPA has a comparable antipyretic effect and duration to a high-content FPA (50 mg), but the pharmaceutical composition with low-content FPA has less adverse reactions.

Comparison of Clinical Trial Results of FPA Injections with Clinical Trial Results of Other Non-Steroidal Intravenous Injections for Fever Relief Data of the change of body temperature over time for patients administered with FPA injections (15 mg, 30 mg, single intravenous administration) and ibuprofen injections (100 mg/200 mg/400 mg, intravenous administration every 4 hours, 3 times within 12 hours) are shown in the table below, and FIG. 1 shows body temperature-time curves.

Temperature at each time point after administration of FPA injections and ibuprofen injections (axillary temperature, ° C.)

| Time point (h) | 0 | 1 | 2 | 3 | 4 | 6 | 8 | 10 | 12 |
|---|---|---|---|---|---|---|---|---|---|
| Ibuprofen injection, 100 mg which is administered once every 4 h, 3 times within 12 h. | 38.7 | 38.2 | 37.7 | 37.6 | 37.7 | 37.4 | 37.5 | 37.6 | 37.5 |
| Ibuprofen injection, 200 mg which is administered once every 4 h, 3 times within 12 h. | 38.7 | 38.2 | 37.7 | 37.5 | 37.5 | 37.2 | 37.3 | 37.1 | 37.2 |
| Ibuprofen injection, 400 mg which is administered once every 4 h, 3 times within 12 h. | 38.8 | 38.2 | 37.6 | 37.4 | 37.3 | 37 | 36.9 | 36.8 | 36.9 |
| FPA injection, 15 mg Single administration | 38.8 | 37.8 | 37.4 | 37.4 | 37.3 | 37.5 | 37.3 | 37.0 | 37.0 |
| FPA injection, 30 mg Single administration | 38.9 | 37.8 | 37.1 | 36.9 | 37.0 | 37.4 | 37.5 | 37.5 | 37.3 |

The clinical trial data of ibuprofen injections came from the Caldolor Medical Review of ibuprofen injection on the official website of the U.S. Food and Drug Administration (FDA). The Fahrenheit temperature was converted into Celsius and then further converted into an axillary temperature for comparison.

According to the above table and the body temperature-time curves in FIG. 1, it can be found that the FPA injection can effectively relieve fever in an adult patient, and its antipyretic effect can be effectively maintained for 6 hours to 10 hours or more. In addition, a single administration of the FPA injection shows an equivalent antipyretic effect to 3 administrations of the ibuprofen injection within 12 hours (once every 4 hours). Compared with the ibuprofen injection, the FPA injection has a lower FPA content, and requires a significantly-lower administration frequency, which can improve patient compliance.

The preferred embodiments of the present disclosure are described in detail above. However, the present disclosure is not limited to the specific details in the above embodiments, and various simple modifications can be made to the technical solutions of the present disclosure within the scope of the technical concept of the present disclosure. These simple modifications all fall within the protection scope of the present disclosure.

In addition, it should be noted that various specific technical features described in the specific embodiments above can be combined in any suitable manner, provided that there is no contradiction. To avoid unnecessary repetition, various possible combination modes of the present disclosure are not described separately.

In addition, the various embodiments of the present disclosure can be combined in any way, and any combined embodiment should also be regarded as the content disclosed in the present disclosure, as long as it does not violate the spirit of the present disclosure.

What is claimed is:

1. A method for preparing an intravenous pharmaceutical composition for fever relief in a patient, wherein the pharmaceutical composition comprises
   flurbiprofen axetil (FPA),
   oil-for-injection, wherein the oil-for-injection is olive oil and/or medium-chain triglyceride, an emulsifying agent, wherein the emulsifying agent is egg lecithin, an isoosmotic adjusting agent, wherein the isoosmotic adjusting agent is glycerin, a pH adjusting agent, and water-for-injection (WFI);

the method comprising the following steps:

(1) taking a part of the WFI, heating, and dissolving the isoosmotic adjusting agent in the part of the WFI to obtain a water phase;

(2) heating the oil-for-injection, adding the emulsifying agent and the FPA, and stirring for dissolution to obtain an oil phase;

(3) adding the oil phase in step (2) to the water phase in step (1), heating, and conducting a high-speed shear dispersion to obtain an initial emulsion;

(4) adjusting a pH of the initial emulsion to 5.0 to 9.0, and adding a remaining WFI;

(5) conducting a high-pressure homogenization to obtain a homogenate; and (6) filtering, bottling a specified amount, sealing, and sterilizing the homogenate, wherein the specified amount bottled is 1.5 ml and a content of the FPA in the specified amount bottled is 15 mg, or the specified amount bottled is 3 ml and a content of the FPA in the specified amount bottled is 30 mg.

2. A method of treatment of acute fever comprising the step of intravenously administering an intravenous pharmaceutical composition to a patient with an axillary body temperature ≥38.5° C. to relieve the acute fever, wherein the pharmaceutical composition comprises flurbiprofen axetil (FPA), oil-for-injection, wherein the oil-for-injection is olive oil and/or medium-chain triglyceride, an emulsifying agent, wherein the emulsifying agent is egg lecithin, an isoosmotic adjusting agent, wherein the isoosmotic adjusting agent is glycerin, a pH adjusting agent, and water-for-injection (WFI); and a method for preparing an intravenous pharmaceutical composition comprises the following steps:

(1) taking a part of the WFI, heating, and dissolving the isoosmotic adjusting agent in the part of the WFI to obtain a water phase;

(2) heating the oil-for-injection, adding the emulsifying agent and the FPA, and stirring for dissolution to obtain an oil phase;

(3) adding the oil phase in step (2) to the water phase in step (1), heating, and conducting a high-speed shear dispersion to obtain an initial emulsion;

(4) adjusting a pH of the initial emulsion to 5.0 to 9.0, and adding a remaining WFI;

(5) conducting a high-pressure homogenization to obtain a homogenate; and (6) filtering, bottling a specified amount, sealing, and sterilizing the homogenate, wherein the specified amount bottled is 1.5 ml and a content of the FPA in the specified amount bottled is 15 mg, or the specified amount bottled is 3 ml and a content of the FPA in the specified amount bottled is 30 mg.

3. The method according to claim 2, wherein a fever relief effect of the pharmaceutical composition is maintained for 6 hours or more after a single administration of the pharmaceutical composition.

4. The method according to claim 2, wherein a fever relief effect of the pharmaceutical composition is maintained for 8 hours or more after a single administration of the pharmaceutical composition.

5. The method according to of claim 2, wherein a fever relief effect of the pharmaceutical composition is maintained for 10 hours or more after a single administration of the pharmaceutical composition.

* * * * *